United States Patent
Madon et al.

(10) Patent No.: US 6,716,338 B2
(45) Date of Patent: Apr. 6, 2004

(54) FCC CATALYSTS FOR FEEDS CONTAINING NICKEL AND VANADIUM

(75) Inventors: Rostam Madon, Flemington, NJ (US); David H. Harris, Mountainside, NJ (US); Mingting Xu, Edison, NJ (US); David Stockwell, Middlesex, NJ (US); Bruce Lerner, Princeton Junction, NJ (US); Glenn W. Dodwell, Bartlesville, OK (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/190,992

(22) Filed: Jul. 8, 2002

(65) Prior Publication Data

US 2003/0130107 A1 Jul. 10, 2003

Related U.S. Application Data

(63) Continuation-in-part of application No. 09/978,180, filed on Oct. 17, 2001.

(51) Int. Cl.$^7$ ................................................ B01J 29/08
(52) U.S. Cl. .................... 208/120.01; 208/118; 502/64; 502/65; 502/68; 502/73; 502/79
(58) Field of Search .............................. 502/63, 64, 65, 502/68, 73, 79; 208/118, 120.01

(56) References Cited

U.S. PATENT DOCUMENTS

| | | | |
|---|---|---|---|
| 4,493,902 A | 1/1985 | Brown et al. .................. 502/65 |
| 4,716,136 A | * 12/1987 | Weisz et al. ................... 502/64 |
| 5,023,220 A | 6/1991 | Dight et al. .................... 502/65 |
| 5,395,809 A | 3/1995 | Madon et al. .................. 502/68 |
| 5,559,067 A | 9/1996 | Lerner et al. .................. 502/68 |
| 5,993,645 A | 11/1999 | Madon et al. |
| 2002/0115556 A1 * | 8/2002 | Stockwell et al. ............ 502/63 |
| 2003/0050181 A1 * | 3/2003 | Gibson et al. ................ 502/64 |
| 2003/0089640 A1 * | 5/2003 | Madon et al. ................ 502/64 |

FOREIGN PATENT DOCUMENTS

WO WO 95/30725 11/1995

OTHER PUBLICATIONS

PCT Search report for PCT/US02/32122, no date available.

* cited by examiner

*Primary Examiner*—Tom Dunn
*Assistant Examiner*—Christina Ildebrando
(74) *Attorney, Agent, or Firm*—Raymond F. Keller

(57) ABSTRACT

A fluid catalytic cracking catalyst made from microspheres that initially contain kaolin, a dispersible boehmite alumina and a sodium silicate or silica sol binder. The kaolin portion contains hydrous kaolin and optionally spinel, or mullite, or both spinel and mullite made via kaolin which has been calcined through its characteristic exotherm. Calcination of the hydrous clay to metakaolin and formation of in-situ zeolite by treatment with sodium silicate yields a catalyst containing Y-faujasite and transforms the dispersible boehmite into a transitional alumina. The catalyst can be used to crack resid or resid-containing feeds as the alumina phase formed from the dispersible boehmite passivates nickel and vanadium contaminants.

48 Claims, 1 Drawing Sheet

FCC CATALYSTS FOR FEEDS CONTAINING NICKEL AND VANADIUM

CROSS REFERENCE TO RELATED APPLICATIONS

This application is a continuation-in-part application of U.S. Ser. No. 09/978,180 filed Oct. 17, 2001.

FIELD OF THE INVENTION

This invention relates to catalysts useful for cracking heavy hydrocarbon feed stocks, such as residuum (resid) and residuum-containing feeds, that contain high levels of nickel and vanadium contaminants. In particular, the invention is directed to improvements in zeolitic fluid cracking catalysts (FCC) produced by an in-situ reaction wherein preformed microspheres obtained by calcining microspheres composed of a mixture of hydrated kaolin, a dispersible boehmite alumina, binder, and kaolin or other clay calcined through its characteristic exotherm, undergo chemical reaction with sodium silicate solution to form crystals of zeolite and a porous silica/alumina matrix. The catalyst is metals tolerant, has good catalytic selectivity and is especially useful as a catalyst for cracking resids and resid-containing feeds.

BACKGROUND OF THE INVENTION

Since the 1960's, most commercial fluid catalytic cracking catalysts have contained zeolites as an active component. Such catalysts have taken the form of small particles, called microspheres, containing both an active zeolite component and a non-zeolite component in the form of a high alumina, silica-alumina matrix. The non-zeolitic component or matrix is known to perform a number of important functions, relating to both the catalytic and physical properties of the catalyst. Oblad described those functions as follows:

"The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad Molecular Sieve Cracking Catalysts, The Oil And Gas Journal, 70, 84 (Mar. 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

For many years a significant proportion of commercial FCC catalysts used throughout the world have been made by in-situ synthesis from precursor microspheres containing kaolin that had been calcined at different severities prior to formation into microspheres by spray drying.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50–70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an, aqueous slurry of powdered raw (hydrated) kaolin clay ($Al_2O_3:2SiO_2:2H_2O$) and powdered calcined kaolin clay that has undergone the exotherm together with a small amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this results in microspheres containing the desired mixture of metakaolin, kaolin calcined-to undergo the exotherm and sodium silicate binder. In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30–60% by weight metakaolin and about 40–70% by weight kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology.

U.S. Pat. Nos. 5,023,220 and 5,395,809, assigned to the present assignee are further examples of patents which teach the formation of catalytic FCC microspheres from mixtures of hydrous kaolin, metakaolin and kaolin that has been calcined through the characteristic exotherm. These mentioned patents are herein incorporated by reference in their entirety.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking activity in present day FCC catalysts is attributable to both the zeolite and non-zeolite (e.g., matrix) components. Zeolite cracking tends to be gasoline selective. Matrix cracking tends to be less gasoline selective. After appropriate ion-exchange treatments with rare earth cations, high zeolite content microspheres produced by the in situ procedure described in the '902 patent are both highly active and highly gasoline selective. As zeolite content of these unblended microspheres is increased, both activity and selectivity tend to increase. This may be explained by the decrease in matrix content with increase in zeolite content and the decreasingly prominent role of nonselective matrix cracking.

In recent years the oil refining industry has shifted to processing a larger quantity of resid due to the changing product slate and price structure of crude oil. Since the early 1980's many refiners have been processing at least a portion of resid as a feedback in their units and several now run a full resid cracking program. Processing resid can drastically alter yields of valuable products in a negative direction relative to a light feed.

Several factors are important to resid catalyst design. It is highly favorable if the catalyst can upgrade bottoms, minimize coke and gas formation, maximize catalyst stability, and minimize deleterious contaminant selectivity due to metal contaminants in resid feedstocks such as nickel and vanadium. While in-situ catalysts are commercially valuable, none of these in-situ catalysts possessed such a combination of properties when used to crack resid feedstocks.

Following the inception of catalytic cracking by Houdry in the early 1900's where an acid treated clay was used, the first revolution in the art of catalyst technology was the use of synthetic silica-alumina. The use of silica-alumina which had much more acidic Bronsted and Lewis acid sites increased the cracking activity and selectivity of the process over the clays. The second revolution came with the advent of zeolites and the discovery that they could be applied to cracking. The clear advantage of the zeolite was that the non-selective cracking to coke and gas was greatly reduced owing to the discrete pore structure of the crystalline zeolite and the shape selective chemistry which they provided. With the thrust in modern refining to limit the amount of coke and gas so as to maximize gasoline production the designed use of silica-alumina in cracking catalysts has decreased (see A. A. Avidan in: *Fluid Catalytic Cracking*: Science and Technology. Studies in Surface Science and Catalysis, Vol. 76. Magee, J. S. and Mitchell, M. M. Eds.; Elsevier, Amsterdam; 1993). The use of added aluminas has also found merit in helping to boost a catalyst's activity since pure aluminas also posses acidic sites. The relative activity of a catalyst is roughly proportional to the total quantity of acid sites present. Unfortunately alumina characteristically contains a large fraction of Lewis acid sites relative to Bronsted type sites. Lewis sites have been shown to be largely involved in the chemistry of hydride abstraction and coke formation (see Mizuno, et al. in Bulletin of the Chemical Society of Japan, Vol. 49, 1976, pp. 1788–1793).

Fluid cracking catalysts which contain silica-alumina or alumina matrices are termed catalysts with "active matrix". Catalysts of this type can be compared with those containing untreated clay or a large quantity of silica and which are termed "inactive matrix" catalysts. Work done by Otterstedt, et al. (Applied Catalysts, Vol. 38, 1988, pp. 143–155.) clearly shows the disadvantage of active matrices for coke and gas production sometimes producing twice as much as the inactive formulation.

Aluminas have long been used in hydrotreating and reforming catalyst technology (see P. Grange in Catalysis Reviews—Science and Engineering, Vol. 21, 1980, p. 135). Aluminas, and particularly transition aluminas, in addition to displaying acidic character also posses high surface areas typically on the order of several hundred meters squared per gram. They may be well suited for catalyst applications such as those mentioned where a metallic component is to be supported on the substrate surface (alumina in this case). The high surface area of the host material above allows for a more uniform, dispersed arrangement of the metal. This leads to smaller metal crystallites and helps to minimize metal agglomeration. Metal agglomeration or sintering is a leading cause of loss of activity since the activity for metal catalyzed reaction is proportional to the exposed metal surface area. When the metal sinters metallic surface area is lost and so is activity. In relation to catalytic cracking, despite the apparent disadvantage in selectivity, the inclusion of aluminas or silica-alumina has been beneficial in certain circumstances. For instance when processing a hydrotreated/demetallated vaccum gas oil (hydrotreated VGO) the penalty in non-selective cracking is offset by the benefit of cracking or "upgrading" the larger feed molecules which are initially too large to fit within the rigorous confines of the zeolite pores. Once "precracked" on the alumina or silica-alumina surface, the smaller molecules may then be selectively cracked further to gasoline material over the zeolite portion of the catalyst. While one would expect that this precracking scenario might be advantageous for resid feeds they are unfortunately characterized for the most part as being heavily contaminated with metals such as nickel and vanadium and to a lesser extent, iron. When a metal such as nickel deposits on a high surface area alumina such as those found in typical FCC catalysts, it is dispersed and participates as highly active centers for the catalytic reactions which result in the formation of contaminant coke (contaminant coke refers to the coke produced discretely from reactions catalyzed by contaminant metals). This additional cokes exceeds that which is acceptable by refiners.

Loss of activity or selectivity of the catalyst may also occur if the metal contaminants such as nickel, vanadium, from the hydrocarbon feedstock, deposit onto the catalyst. These metal contaminants are not removed by standard regeneration (burning) and contribute markedly to undesirably high levels of hydrogen, dry gas and coke and reduce significantly the amount of gasoline that can be made. Contaminant metal levels are particularly high in certain feedstocks, especially the more abundant heavier crudes. As oil supplies dwindle, successful economic refining of these heavier crudes becomes more urgent. In addition to reduced amounts of gasoline, these contaminant metals contribute to much shorter life cycles for the catalyst and an unbearably high load on the vapor recovery system. Deposited nickel and vanadium species have an intrinsic dehydrogenation activity which leads to the formation of coke and gas, two undesirable products. Furthermore, vanadium assists in destroying the crystallinity of the sieve. This leads to a loss of catalytic activity and to the formation of certain silica-alumina species which tend to promote the formation of coke and gas. The increased expense of refining metal-contaminated feedstocks due to the aforementioned factors lays a heavy economic burden on the refiner. Therefore, much effort has been spent in finding means to modify the catalyst or feedstock in such a way as to passivate the aforementioned undesirable effects of the metal contaminants.

Commonly assigned U.S. Pat. No. 5,559,067 addresses the problem of providing a resid FCC catalyst made by the in-situ route which can upgrade bottoms, minimize coke and gas formation, maximize catalyst stability and minimize deleterious contaminant selectivity due to contaminant metals. The resid FCC catalyst of the patent achieves metal tolerance in a manner considered to be relatively inexpensive to practice and does not result in the use of environmentally toxic additives such as the use of prior art technologies for achieving metals tolerance such as those involving the use of antimony. In accordance with the patent, microspheres comprising hydrous kaolin clay, gibbsite (alumina trihydrate), spinel, and a silica sol binder are prepared, the microspheres calcined to convert the hydrous kaolin component to metakaolin and the calcined microspheres reacted with an alkaline sodium solution into crystallized zeolite Y and ion exchanged.

During the conversion of hydrous kaolin to metakaolin, gibbsite also undergoes transformation to a transition alumina. Transition alumina may be defined as any alumina which is intermediate between the thermodynamically stable phases of gibbsite, bayerite, boehmite, and nordstandite on one end of the spectrum and alpha alumina or corrundum on the other. Such transition aluminas may be viewed as metastable phases. A scheme of the transformation sequence can be found in the text: *Oxides and Hydroxides of Aluminum* by K. Wefers and C. Misra; Alcoa Technical Paper No. 19, revised; copyright Aluminum Company of America Laboratories, 1987.

SUMMARY OF THE INVENTION

A novel, in-situ fluid cracking catalyst is provided which is useful in cracking feeds that contain nickel and vanadiaum. The FCC catalyst of this invention is made from microspheres which initially contain kaolin, binder, and a dispersible boehmite alumina. The microsphere is subsequently converted using standard in-situ Y zeolite growing procedures to make a Y-containing catalyst. Exchanges with ammonium and rare earth cations with appropriate calcinations provides an FCC catalyst that contains a transitional alumina obtained from the boehmite.

Preparation of the novel fluid cracking catalyst, in accordance with an aspect of this invention, involves an initial step of preparing microspheres comprising hydrous kaolin clay and/or metakaolin, a dispersible boehmite ($Al_2O_3$, $H_2O$), optionally spinel and/or mullite, and a sodium silicate or silica sol binder. The microspheres are calcined to convert any hydrous kaolin component to metakaolin. The calcination process transforms the dispersible boehmite into a transitional alumina phase. The calcined microspheres are reacted with an alkaline sodium silicate solution to crystallize zeolite Y and ion-exchanged. The transitional alumina phase that results from the dispersible boehmite during the preparative procedure and which forms the matrix of the final catalyst, passivates the Ni and V that are deposited on to the catalyst during the cracking process, especially during cracking of heavy residuum feeds. This results in a substantial reduction in contaminant coke and hydrogen yields. Contaminant coke and hydrogen arise due to the presence of Ni and V and reduction of these byproducts significantly improves FCC operation.

DETAILED DESCRIPTION OF THE INVENTION

Figure 1:
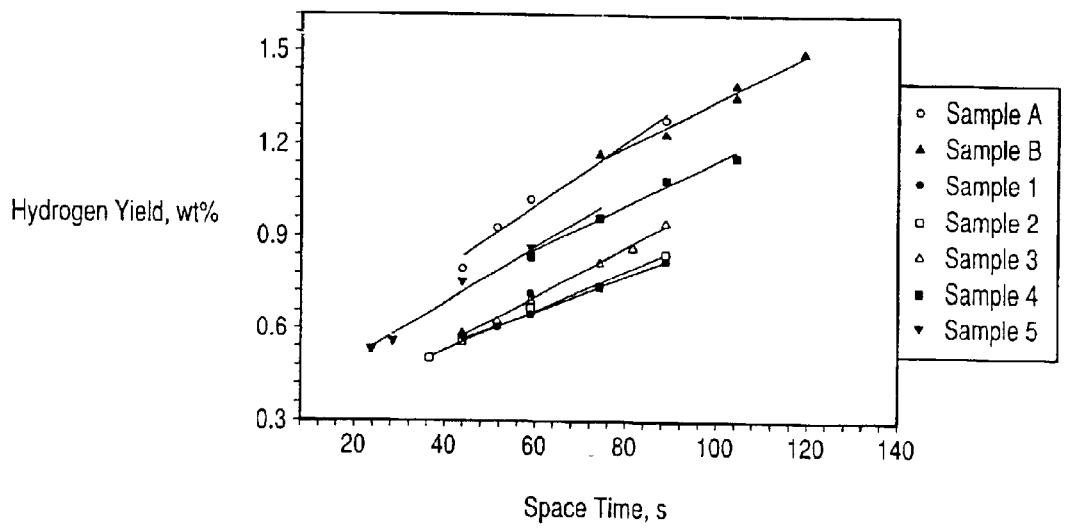
FIG. 1 is a graph comparing the hydrogen yields of cracking catalysts of the present invention and control catalysts upon cracking a heavy aromatic feed.

Catalysts of the invention are made by spray drying a feed mixture of hydrated kaolin, boehmite alumina and silica sol or sodium silicate binder. The spray dried microspheres are washed or optionally acid-neutralized and washed to reduce sodium content, and then calcined to form precursor porous microspheres in which any of the hydrous kaolin is converted to metakaolin. It is preferred that calcination be conducted at temperatures below that which would cause any kaolin present to undergo the characteristic kaolin exothermic reaction to spinel or mullite. Optionally, the feed mixture to the spray drier may include spinel, or mullite, or a combination of both spinel and mullite, most of which along with the boehmite will form the non-zeolite matrix of the catalyst. The addition of spinel and/or mullite to the microsphere results in an FCC catalyst that contains multiple matrix components; i.e., the alumina, and the spinel and/or mullite. The spinel is useful for improving the upgrading of the heaviest fraction, in a feed, referred to as bottoms. The ratio of alumina to spinel or mullite is important, since as this ratio decreases, there is less effective passivation on Ni and V. Any binder, which is used, should contain only sodium, expressed as $Na_2O$, which is easily exchangeable.

The precursor microspheres are reacted with zeolite seeds and an alkaline sodium silicate solution, substantially as described in U.S. Pat. No. 5,395,809, the teachings of which are incorporated herein by cross-reference. The microspheres are crystallized to a desired zeolite content (typically ca. 50–65%), filtered, washed, ammonium exchanged, exchanged with rare-earth cations if required, calcined, exchanged a second time with ammonium ions, and calcined a second time if required.

Especially preferred compositions of the solids in the slurries that are spray dried to form porous microspheres, and later calcined to prepare precursor microspheres, are expressed hereinafter below in table form as the weight percent of hydrated kaolin, boehmite, and spinel and/or mullite on a binder-free basis; weight % $SiO_2$ binder is based on the total weight of dry microspheres and provided by sodium silicate.

| Ingredients | Broad | Preferred |
| --- | --- | --- |
| Hydrated Kaolin | 0–90 | 15–85 |
| Metakaolin | 0–60 | 0–30 |
| Boehmite Alumina | 5–50 | 10–40 |
| Spinel and/or Mullite | 0–85 | 5–70 |
| Binder | 5–35 | 5–25 |

The reactive kaolin of the slurry to form the microspheres can be formed of hydrated kaolin or calcined hydrous kaolin (metakaolin) or mixtures thereof. The hydrous kaolin of the feed slurry can suitably be either one or a mixture of ASP® 600 or ASP® 400 kaolin, (Engelhard Corp. Iselin, N.J.) derived from coarse white kaolin crudes. Finer particle size hydrous kaolins can also be used, including those derived from gray clay deposits, such as LHT pigment. Purified water-processed kaolin clays from Middle Georgia have been used with success. Calcined products of these hydrous kaolins can be used as the metakaolin component of the feed slurry.

Silicate for the binder is preferably provided by sodium silicates with $SiO_2$ to $Na_2O$ ratios of from 1.5 to 3.5 and especially preferred ratios of from 2.00 to 3.22.

A commercial source of powdered kaolin calcined through the exotherm, e.g., Satintone®, Ansilex® 93 (Engelhard Corp.) calcined kaolin, may be used as the spinel component. Preferably, hydrated kaolin clay is converted to this state by calcining the kaolin at least substantially completely through its characteristic exotherm. (The exotherm is detectable by conventional differential thermal analysis, DTA.) For example, a one inch bed of hydrated kaolin clay may be calcined for about 1–2 hours in a muffle furnace at a chamber temperature of about 1800°–1900° F. to produce clay that has been calcined through its characteristic exotherm, preferably without any substantial formation of mullite. During calcination, some of the finely divided clay agglomerate into larger particles. After completion of calcination, the agglomerated calcined clay is pulverized into finely divided particles before being introduced into the slurry that is fed to a spray dryer. The spray dried product is repulverized. The surface area (BET) of typical spinel from kaolin is low, e.g., 5–10 $m^2/g$; however, when this material is placed in a caustic environment such as that used for crystallization, silica is leached, leaving an alumina-rich residue having a high surface area, e.g. 100–200 $m^2/g$ (BET).

Mullite can also be used as a matrix component. Mullite is made by firing clay at temperatures above 2000° F. For example M93 mullite may be made from the same kaolin clay source as Ansilex 93, used for the preparation of spinel component. Mullite can also be made from other kaolin clays. Mullite may also be made from Kyanite clay. Kyanite is a clay mineral found, for example, in Virginia and the mullite from it has the basic formula $3Al_2O_3$—$SiO_2$. Heating Kyanite clay to a high temperature of 3000° F., provides a more crystalline, purer mullite in the calcined product than that obtained from kaolin clay.

It is preferred that the alumina used to prepare the microsphere is a highly dispersible boehmite. Other aluminas such as pseudo-boehmite with low dispersiblity, and gibbsite are not as effective. Dispersibility of the hydrated alumina is the property of the alumina to disperse effectively in an acidic media such as formic acid of pH less than about 3.5. Such acid treatment is known as peptizing the alumina. High dispersion is when 90% or more of the alumina disperses into particles less than about 1 micron. When this dispersed alumina solution is spray dried with the kaolin and binder, the resulting microsphere contains uniformly distributed alumina throughout the microsphere.

The surface area (BET, nitrogen) of the crystalline boehmite (as well as the gamma-delta alumina conversion product) is below 150 $m^2/g$, preferably below 125 $m^2/g$, and most preferably below 100 $m^2/g$, e.g. 30–80 $m^2/g$.

Following are typical properties of fully peptizable and dispersible crystalline boehmites which can be used in practice of the invention.

| | | |
| --- | --- | --- |
| $Al_2O_3$ | wt % | 99.0 min. (ignited) |
| Carbon | " | 0.5 max. |
| $SiO_2$ | " | 0.015 max. |
| $Fe_2O_3$ | " | 0.015 max. |
| $Na_2O$ | " | 0.005 max. |
| Surface Area ($m^2/g$) | | (before calcination) 30–80 |
| Pore volume, cc/g | | 70% in pores having radii from 100 to 1,000 Å units |
| Total volatiles | | ~20 wt. % max. |
| Pore size diameter | | 150–1,000 Å |

Monoprotic acids, preferably formic, can be used to peptize the crystalline boehmite. Other acids that can be employed to peptize the alumina are nitric and acetic.

During production, spray dried microspheres containing crystalline boehmite in the matrix are calcined. As a result of calcination, the crystalline boehmite is converted to a porous gamma phase and to a lesser extent a delta alumina. The BET surface area of this material only increases marginally, e.g., increases from 80 $m^2/g$ to 100 $m^2/g$.

In preferred embodiment of the invention, an aqueous slurry of finely divided hydrated kaolin, kaolin that has been calcined through its characteristic exotherm, boehmite and binder is prepared. More preferably, the finely divided boehmite alumina peptized with formic acid at pH 2.7 to 3.2 is slurried in water and is added separately to the aqueous slurry of hydrous koalin and binder. Thus, the hydrous kaolin, calcined kaolin and binder are premixed in one tank and fed to the spray drier from one line, and the aqueous alumina slurry, peptized such as with formic acid is introduced from a separate line immediately prior to when the whole mix enters the spray drier. Other mixing and injection protocols may also be useful. The final slurry solids are about 30–50 wt. %. The aqueous slurry is then spray dried to obtain microspheres comprising a silica bonded mixture of hydrated kaolin, boehmite and kaolin that has been calcined at least substantially through its characteristic exotherm (spinel, or mullite, or both spinel and mullite). The microspheres have average particle diameters that are typical of commercial fluid catalytic cracking catalysts, e.g., 65–85 microns. Suitable spray drying conditions are set forth in the '902 patent.

After spray drying, the microspheres are washed and calcined at a temperature and for a time (e.g., for two to four hours in a muffle furnace at a chamber temperature of about 1500°–1550° F.) sufficient to convert the hydrated clay component of the microspheres to metakaolin, leaving the spinel component of the microspheres essentially unchanged. Most preferably the calcined microspheres comprise about 30 to 70% by weight metakaolin, about 10 to 50% by weight spinel and/or mullite and 15 to 40% by weight transitional phase alumina.

After crystallization by reaction in a seeded sodium silicate solution, the microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.5% and most preferably less than about 0.4%, by weight $Na_2O$. After ion exchange, the microspheres are dried to obtain the microspheres of the present invention. In order to make 0 (zero) wt. % rare earth (REO) catalysts, the $Na^+$ cations are exchanged by using only an ammonium salt such as $NH_4NO_3$ and without using any rare earth salt during exchange. Such 0 (zero) wt. % REO catalysts are especially beneficial as FCC catalysts that give higher octane gasoline and more olefinic product. Rare earth versions of catalysts of this invention, post treated after crystallization by ion-exchange with high levels of rare earth, e.g., by procedures such as described in the '902 patent, are useful when exceptionally high activity is sought and the octane rating of the FCC gasoline produce is not of prime importance. Rare earth levels in the range of 0.1% to 12% usually between 0.5% and 7% (weight basis) are contemplated. Following ammonium and rare earth exchange, the catalyst is calcined at 1100°–1200° F. for 1–2 hours and unit cell size of the Y zeolite is reduced. Preferably, this calcination is done in a covered tray with 25% free moisture present.

"Silica Retention" may be practiced to alter porosity. The teachings of U.S. Pat. No. 4,493,902 at col. 12, 1.3–31, regarding silica retention are incorporated herein by cross-reference.

The preferred catalyst of the invention comprises microspheres containing at least 15% and preferably from 40 to 65% by weight Y faujasite, expressed on the basis of the as-crystallized sodium faujasite form zeolite. As used herein, the term Y faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 Å as determined by the technique described in the ASTM standard method of testing titled "Determination of the Unit Cell Size Dimension of a Faujasite Type Zeolite" (Designation D3942-80) or by an equivalent technique. The term Y faujasite shall encompass the zeolite in its sodium form as well as in the known modified forms, including, e.g., rare earth and ammonium exchanged forms and stabilized forms. The percentage of Y faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

It is preferred that the Y faujasite component of the microspheres, in their sodium form, have a crystalline unit cell size of less than about 24.73 Å and most preferably less than about 24.69 Å. Typically, the Y faujasite component of the microspheres has a crystalline unit cell size range of between 24.64 to 24.73 Å, corresponding to a $SiO_2/Al_2O_3$-molar ratio of the Y faujasite of about 4.1–5.2.

Table 1 below sets forth ranges for the chemical composition and surface areas of catalysts formed in accordance with this invention.

TABLE 1

Range of surface areas and UCS for invention catalyst

| Range | Low | High |
|---|---|---|
| $SiO_2$, wt. % | 35 | 65 |
| $Al_2O_3$, wt. % | 30 | 60 |
| TSA, $m^2/g$ | 300 | 475 |
| MSA, $m^2/g$ | 50 | 120 |
| ZSA, $m^2/g$ | 190 | 415 |
| UCS, A | 24.40 | 24.60 |

Conditions useful in operating FCC units utilizing catalyst of the invention are well-known in the art and are contemplated in using the catalysts of the invention. These conditions are described in numerous publications including Catal. Rev.—Sci. Eng., 18 (1), 1–150 (1978), which is incorporated herein by cross-reference. The catalysts of this invention are particularly useful in cracking residuum and resid-containing feeds having a Ni+V metals content of at least 2,000 ppm and a Conradson carbon content greater than about 1.0.

EXAMPLE 1

Preparation of Catalysts

Below is described the preparation of five catalyst samples that exemplify the catalyst of the present invention. Each catalyst was an in-situ catalyst made from microspheres that contained kaolin in some form, dispersible boehmite alumina that is indicated as AOH, and sodium silicate binder. Formulations of the microspheres are described as a combination of kaolins and alumina and add up to 100%. To this was added sodium silicate binder written as % $SiO_2$. Each sample is identified by a ratio x/y where x is the alumina AOH and y is some form of calcined kaolin.

Formulation of Microspheres

Sample 1: 30/0–70% hydrous kaolin, 30% AOH, 15% silica binder.

Sample 2: 30/10–60% hydrous kaolin, 30% AOH, 10% spinel, 15% silica binder.

Sample 3: 20/10–70% hydrous kaolin, 20% AOH, 10% spinel, 15% silica binder.

Sample 4: 20/10–70% hydrous kaolin, 20% AOH, 10% mullite, 15% silica binder.

Sample 5: 20/60–15% hydrous kaolin, 20% AOH, 60% spinel, 5% silica binder.

To make the microspheres, the hydrous kaolin, spinel, water, and silicate binder were spray dried together. Kaolins and binder were premixed together in one tank and fed to the dryer from one line, and the alumina slurry, peptized with formic acid at pH of 2.7 to 3.2, was introduced to this premix from a separate line just before the whole mix was directed into the spray drier. All microspheres were finally calcined at 1500° F. for 4 hours. The temperature and time of the calcination ensured that all hydrous kaolin was transformed to a reactive metakaolin clay.

Zeolite Crystallization and Work Up of Microspheres (MS) Samples 1 to 4—Crystallization Conditions $SiO_2/Na_2O$=2.70, $SiO_2/Al_2O_3$=7.0, $H_2O/Na_2O$=7.0, Seeds/MS=0.0044

Reaction temperature: 210° F., Crystallization time: 20 to 30 hours

Target zeolite index=50 to 70%

Other formulations may be used; the above described formulation is a typical example.

After crystallization a series of base exchanges and calcinations were done as follows:
(a) First series of ammonium exchanges were conducted to a target 2.7% $Na_2O$
   Three exchanges at 180° F. and pH 3 (15 min. for each exchange)
   1 g 54% $NH_4NO_3$:1 g VF Catalyst:1 g $H_2O$
   Repeated for second exchange
   0.5 g 54% $NH_4NO_3$:1 g VF catalyst:1 g $H_2O$
(b) Rare earth nitrate exchanged catalyst to following target
   One exchange at 180° F. and pH 3.25 for 30 min.
   Target REO 3.0%, Dose to give REO 3.7% (range 2.6 to 3.5)
(c) Dried the sample
(d) Shock calcined sample at 1200° F./2 hr./25% LOI
(e) Second series of ammonium exchanges were conducted to a target 0.35% $Na_2O$
   (Range 0.3–0.55%) $Na_2O$
   Five exchanges at 180° F. and pH 3 and 15 min each.
   All were 1 g 54% $NH_4NO_3$:1 g VF catalyst:1 g $H_2O$
(f) Final shock calcination at 1200° F./2 hr./25% LOI.
   Target UCS=24.50 A.
   See Table 2 for a summary of the chemical composition and surface area properties of the catalyst samples.
   Sample 5—Crystallization Conditions
   $SiO_2/Na_2O$=3.15, $SiO_2/Al_2O_3$=7.50, $H_2O/Na_2O$=10.75, Seeds/MS=0.0044
Reaction temperature: 210° F., Crystallization time: 22–28 h, Target Zeolite Index: 40–55%
Steps (a) to (b) as shown above were conducted to obtain final catalyst.
See Table 2 for a summary of the chemical compositions and surface area properties of the catalyst samples.

TABLE 2

| | Catalyst Sample | | | | |
|---|---|---|---|---|---|
| Microsphere | 1<br>30/0 | 2<br>30/10 | 3<br>20/10 (1) | 4<br>20/10 (2) | 5<br>20/60 |
| $Na_2O$, wt. % | 0.39 | 0.36 | 0.38 | 0.48 | 0.16% |
| REO, wt. % | 3.30 | 3.34 | 3.56 | 2.57 | 4.44% |
| $SiO_2$, wt. % | 53.53 | 52.3 | 58.2 | 57.46 | 40.98% |
| $Al_2O_3$, wt. % | 40.44 | 41.8 | 36.6 | 37.94 | 52.07% |
| TSA, $m^2/g$ | 409.10 | 404.7 | 446 | 435.6 | 341.6 |
| MSA, $m^2/g$ | 77.0 | 77.0 | 80 | 77.4 | 102.3 |
| ZSA, $m^2/g$ | 332.1 | 327.7 | 366 | 358.2 | 239.3 |
| UCS | 24.510 | 24.505 | 24.558 | 24.487 | 24.535 |

EXAMPLE 2

Control Sample Preparation

The five samples above were tested versus two in-situ FCC catalysts that did not contain AOH in the formulation. These controls are identified as Samples A and B.

Sample A had a starting microsphere formulation of 70% hydrous kaolin, 30% spinel, ca. 12% silica binder and is therefore designated as 0/30.

Sample B had a starting microsphere formulation of 70% hydrous kaolin, 15% gibbsite alumina, 15% spinel, 15% silica binder (as silica sol instead of sodium silicate). Note here the alumina used was gibbsite which is not dispersible like AOH.

Both catalysts were crystallized and worked up using the same approach as that used for Samples 1 to 4.

EXAMPLE 3

Tests and Evaluation

Microactivity tests (MAT) were carried out using a heavy aromatic feed. The MAT conditions were 970° F. reactor temperature, 1.2 g of feed delivered in 30 s, catalyst weight was varied to vary space time (inverse space velocity). Space time is defined as catalyst weight/feed flow rate.

In order to note behavior with Ni and V, all catalysts were first steamed at 1350° F. for 2 hours in 100% flowing steam. Then 3000 ppm Ni and 3000 ppm V were added as naphthanate or oleate solutions in cyclohexane via the Mitchell method. The organic compound was burned away, and the metal-containing catalysts were steamed again at 1450° F. for 4 hours in a flowing mixture of 90% steam and 10% air.

In order to evaluate catalysts without metals all samples were steamed at 1450° F. for 4 hours in 100% flowing steam.

Figure 2:
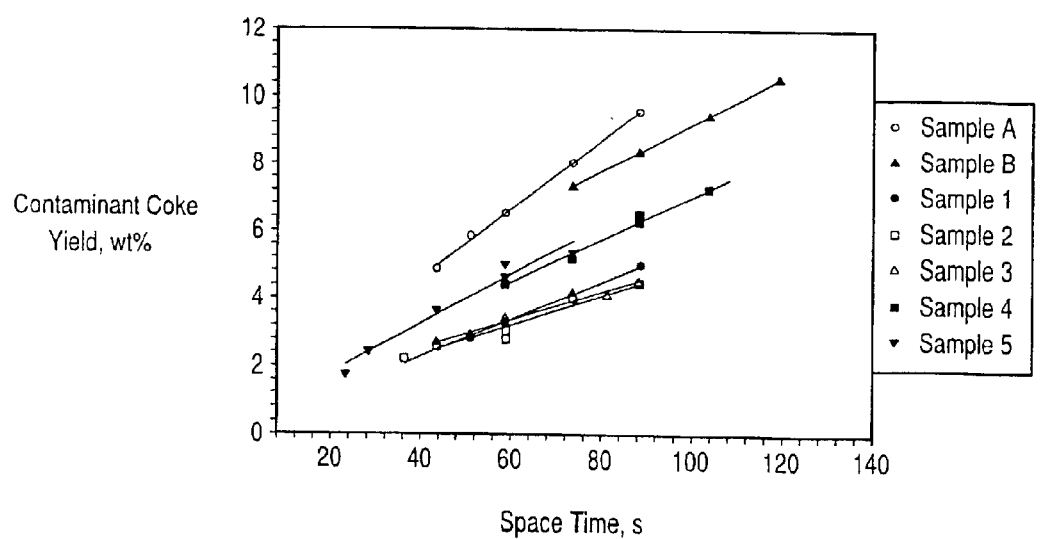
FIG. 2 is a graph comparing the contaminant coke yields of cracking catalysts of the present invention and control catalysts upon cracking a heavy aromatic feed.

Metals Ni and V on the catalysts give rise to excess hydrogen formation and contaminant coke. In order to measure the contaminant coke, the total coke was first obtained with a metallated sample then subtracted from this was the catalytic coke obtained at the corresponding activity with the same sample but not containing metals. For hydrogen, the results from the metallated samples were used since clean samples give very low amounts of hydrogen. The best comparison for ability to passivate Ni and V is made by plotting hydrogen and contaminant coke yields versus space time. See FIGS. 1 and 2. Table 3 compares hydrogen yields and contaminant coke yields at a space time of 80 s.

TABLE 3

Compared at a space time of 80 s

| Catalyst | Hydrogen yield, wt. % | Contaminant coke yield, wt. % |
|---|---|---|
| Sample A | 1.18 | 8.32 |
| Sample B | 1.17 | 7.48 |
| Sample 1 | 0.76 | 4.28 |
| Sample 2 | 0.77 | 3.89 |
| Sample 3 | 0.84 | 4.01 |
| Sample 4 | 0.98 | 5.50 |
| Sample 5 | 1.03 | 5.87 |

From Table 3 and the figures it can be seen that the inventive catalysts, Samples 1 to 5, that contained dispersible boehmite alumina (AOH) gave substantially less hydrogen and contaminant coke than the comparative samples A and B that did not contain AOH.

Table 4 compares Sample A, Sample 1, and Sample 3 at constant 70% conversion. Comparisons are for metallated samples. Only samples with identical activities are thus comparable at constant conversion. Note the higher gasoline yields and low coke yields obtained for the AOH-containing samples.

TABLE 4

| Ratio (1) | Sample A<br>0/30 | Sample 1<br>30/0 | Sample 3<br>20/10 |
|---|---|---|---|
| Hydrogen | 1.31 | 0.84 | 0.91 |
| Methane | 0.94 | 0.86 | 0.88 |
| Ethane | 0.56 | 0.62 | 0.58 |
| Ethylene | 0.77 | 0.83 | 0.80 |
| Total Dry Gas | 3.58 | 3.14 | 3.18 |
| LPG | 11.54 | 11.73 | 11.43 |
| Gasoline | 40.94 | 45.72 | 45.33 |
| LCO | 18.73 | 18.51 | 19.21 |
| HCO | 11.27 | 11.49 | 10.79 |
| Coke | 13.94 | 9.40 | 10.06 |

TABLE 4-continued

| Ratio (1) | Sample A 0/30 | Sample 1 30/0 | Sample 3 20/10 |
|---|---|---|---|
| % Conversion | 70 | 70 | 70 |
| space time, s | 90 | 89 | 89 |

(1) Ratio = AOH/calcined clay

EXAMPLE 4

Three catalysts were made to distinguish the effects of different matrix compositions and physical properties while still incorporating a uniform amount of boehmite, 23 wt. % dispersible boehmite alumina (AOH). In Sample 6, 10% spinel was included in the starting microsphere and was similar to Sample 3. In Sample 7, 38.5% mullite was included in the microsphere. The mullite was obtained by firing a kaolin clay beyond the exotherm. In Sample 8, 37% mullite was included in the microsphere. The mullite for Sample 8 was obtained by firing a Kyanite clay. Samples 6, 7, and 8 all exemplify the catalyst of the present invention.

The formulation of the starting microspheres was as follows:

Sample 6: 23% AOH, 10% spinel, 67% hydrous clay, 15% silica binder

Sample 7: 23% AOH, 38.5% kaolin mullite, 38.5% hydrous clay, 15% silica binder

Sample 8: 23% AOH, 37% Kyanite mullite, 40% hydrous clay, 15% silica binder

Procedure for making the microspheres is given in Example 1.

The zeolite crystallization and work up is also given in Example 1. The procedure, as given in Example 1, was exactly the same for Sample 6. For Sample 7, the crystallization conditions were slightly different but the work up was the same. The conditions for Sample 7 were: $SiO_2/Na_2O=2.9$, $SiO_2/Al_2O_3=5.5$, $H_2O/Na_2O=6.5$, Seeds/MS=0.0044. The conditions for Sample 8 were: $SiO_2/Na_2O=3.1$, $SiO_2/Al_2O_3=8.0$, $H_2O/Na_2O=7.0$, Seeds/MS=0.0044.

Properties of the catalyst are set forth in Table 5.

TABLE 5

| Sample No. | TSA $m^2/g$ | ZSA $M^2/g$ | Hg Pore Volume (40–20,000 Å) cc/g |
|---|---|---|---|
| 6 | 388 | 307 | 0.08 |
| 7 | 379 | 311 | 0.39 |
| 8 | 342 | 271 | 0.17 |

The sample preparation and pretreatments with the addition of Ni and V and steaming were done as given in Example 3. 3000 ppm Ni and 3000 ppm V were added to each catalyst via the Mitchell method. The tests with Sample 6, Sample 7, Sample 8, and the control Sample A (see Example 2) were carried out with a heavier residuum feed than that used in Example 3. These tests were carried out in a fluid bed reactor, whereas the tests in Example 3 were carried out in a fixed bed reactor. The conditions of the tests were as follows: 970° F. reactor conditions, 1.4 g of feed delivered in 30 sec., catalyst weight was varied to vary space time and thus vary conversion. The activity given is a backmixed second order activity of a fluid bed reactor.

The results are given below in Table 6—with yields at 70% conversion.

TABLE 6

| | Sample A | Sample 6 | Sample 7 | Sample 8 |
|---|---|---|---|---|
| Total Dry Gas | 2.33 | 2.40 | 2.13 | 1.98 |
| LPG | 12.63 | 13.31 | 12.40 | 13.02 |
| Gasoline | 41.68 | 42.16 | 44.32 | 43.64 |
| LCO | 18.25 | 16.98 | 18.44 | 17.71 |
| HCO | 11.75 | 13.02 | 11.56 | 12.29 |
| Coke | 13.36 | 12.13 | 11.15 | 11.36 |
| lC4/iC4 = | 1.45 | 1.74 | 1.38 | 1.57 |
| Activity @ space time = 40 s | 6.4 | 5.2 | 5.9 | 4.9 |
| $H_2$ Yield @ space time = 40 s | 0.63 | 0.46 | 0.46 | 0.40 |

Compared to Sample A, which is the control sample, Samples 6, 7, and 8, which contained AOH, showed lower hydrogen yields at constant space time and were thus excellent at mitigating the deleterious effects of Ni and V. Sample 8 shows the best metal passivation. Samples 7 and 8, which contain mullite from different clay sources and have higher porosity than sample 6, provide good metal passivation along with higher gasoline product formation and good bottoms upgrading.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A zeolitic fluid catalytic cracking catalyst which passivates nickel and vanadium during catalytic cracking comprising:

(a) at least about 15% by weight Y-faujasite crystallized in-situ from a metakaolin-containing calcined microsphere; and (b) alumina obtained by the calcination of a dispersible boehmite contained in said microsphere.

2. The fluid catalytic cracking catalyst of claim 1, wherein said alumina comprises a transitional gamma phase.

3. The fluid catalytic cracking catalyst of claim 1, wherein said alumina comprises a combination of transitional gamma and delta phases.

4. The fluid catalytic cracking catalyst of claim 1, wherein said dispersible boehmite is characterized by having at least 90% of said boehmite disperse into particles less than about 1 micron in an acidic media of pH less than about 3.5.

5. The fluid catalytic cracking catalyst of claim 1, wherein said microsphere further contains spinel, mullite or both spinel and mullite.

6. The fluid catalytic cracking catalyst of claim 5, wherein said microsphere contains spinel formed from kaolin calcined through its characteristic exotherm.

7. The fluid catalytic cracking catalyst of claim 5, wherein said microsphere contains mullite formed from kaolin calcined through its characteristic exotherm.

8. The fluid catalytic cracking catalyst of claim 5, wherein said microsphere contains both spinel and mullite formed from kaolin calcined through its characteristic exotherm.

9. The fluid catalytic cracking catalyst of claim 5, wherein said microsphere contains mullite formed by calcination of kyanite clay.

10. The fluid catalytic cracking catalyst of claim 5, wherein said microsphere contains spinel formed from kaolin calcined through its characteristic exotherm and mullite formed by calcination of kyanite clay.

11. The fluid catalytic cracking catalyst of claim 1, wherein said Y-faujasite comprises at least about 40% by weight of said catalyst.

12. The fluid catalytic cracking catalyst of claim 1, wherein said Y-faujasite is ion-exchanged to reduce the sodium content of said catalyst to less than 0.7% by weight $Na_2O$.

13. The fluid catalytic cracking catalyst of claim 1, wherein said Y-faujasite is ion-exchanged to reduce the sodium content of said catalyst to less than 0.5% by weight $Na_2O$.

14. The fluid catalytic cracking catalyst of claim 12, wherein said Y-faujasite is the product of ammonium exchange.

15. The fluid catalytic cracking catalyst of claim 12, wherein said Y-faujasite is exchanged with rare earth cations to provide a rare earth level as REO of 0.1 to 12 wt. %.

16. The fluid catalytic cracking catalyst of claim 12, comprising rare earth levels, expressed as rare earth oxide, REO of 0.5 to 9 wt. %.

17. The fluid catalytic cracking catalyst of claim 1, wherein said Y-faujasite has a crystalline unit cell size of less than 24.7 Å.

18. The fluid catalytic cracking catalyst of claim 5, wherein said calcined microspheres comprise 15 to 85% by weight metakaolin, 5–70% by weight spinel, mullite, or both spinel and mullite, and 10–40% by weight of said alumina.

19. The fluid catalytic cracking catalyst of claim 18, wherein said spinel is formed by calcination of kaolin through its characteristic exotherm.

20. The fluid catalytic cracking catalyst of claim 18, wherein said mullite is formed by calcination of kaolin through its characteristic exotherm.

21. The fluid catalytic cracking catalyst of claim 18, wherein said mullite is formed by the calcination of kyanite clay.

22. The fluid catalytic cracking catalyst of claim 18, wherein said calcined microspheres comprise 15–50% by weight metakaolin, 25–70% by weight mullite, and 15–40% by weight of said alumina.

23. The fluid catalytic cracking catalyst of claim 18, wherein said alumina comprises a transitional gamma phase.

24. The fluid catalytic cracking catalyst of claim 18, wherein said alumina comprises a combination of transitional gamma and delta phases.

25. The fluid catalytic cracking catalyst of claim 23, wherein said dispersible boehmite is characterized by having at least 90% of said boehmite disperse into particles less than about 1 micron in an acidic media of pH less than about 3.5.

26. A method of making a zeolitic fluid catalytic cracking catalyst comprising the steps of:
(a) forming an aqueous slurry containing on a dry basis about 15 to 85 parts by weight hydrated kaolin, metakaolin or mixtures thereof, about 5 to 50 parts by weight dispersible boehmite, about 0–85 parts by weight spinel, mullite, or both, and 5–35% silicate binder;
(b) spray drying the aqueous slurry to obtain microspheres;
(c) calcining the microspheres obtained in step (b) at a temperature and for a time sufficient to convert the hydrated kaolin in the microspheres substantially to metakaolin, but insufficient to cause metakaolin or hydrated kaolin to undergo the characteristic kaolin exotherm;
(d) mixing the microspheres obtained in step (c) with sodium silicate, sodium hydroxide and water to obtain an alkaline slurry; and
(e) heating the alkaline slurry of calcined microspheres to a temperature and for a time sufficient to crystallize at least about 15% by weight Y-faujasite in the microspheres, said Y-faujasite being in the sodium form.

27. The method of claim 26, wherein at least 40% by weight Y-faujasite is crystallized in the microspheres in step (e).

28. The method of claim 26, wherein Y-faujasite seeds are added to the mix of step (d).

29. A method of claim 26 including the steps of:
(f) separating the micropsheres containing at least 15% by weight Y-faujasite from at least a major portion of its mother liquor;
(g) replacing sodium cations in the microspheres separated in step (e) with ammonium ions or ammonium ions and thereafter rare earth ions;
(h) calcining the microspheres from step (g) to facilitate release of sodium ions;
(i) further exchanging the microspheres with ammonium ions to reduce $Na_2O$ content to below 1%; and
(j) further calcining the microspheres to reduce the unit cell size of the zeolite.

30. The method of claim 29 in which the rare earth content expressed as rare earth oxide, REO, is between 0.1 wt. % and 12 wt. %.

31. The method of claim 30 in which the rare earth content expressed as rare earth oxide, REO, is between 0.5 wt. % and 9 wt. %.

32. The method of claim 29 in which the sodium content expressed as $Na_2O$ is less than 0.7 wt. %.

33. The method of claim 29 in which the sodium content expressed as $Na_2O$ is less than 0.4 wt. %.

34. The method of claim 29 in which the sodium content expressed as $Na_2O$ is less than 0.3 wt. %.

35. The method of claim 26, wherein said dispersible boehmite is characterized by having at least 90% of said boehmite disperse into particles less than about 1 micron.

36. The method of claim 26, wherein said aqueous slurry in step (a) is formed from a first slurry of said kaolin and binder and a second slurry of said dispersible boehmite.

37. The method of claim 26, wherein said second slurry comprises said dispersible boehmite peptized in acid.

38. The method of claim 26, wherein said aqueous slurry in step (a) contains 5–60 wt. % spinel, mullite, or both.

39. The method of claim 26, wherein said binder in step (a) is sodium silicate.

40. The method of claim 26, wherein said binder in step (a) is silica sol.

41. A method of cracking a hydrocarbon feed containing at least 2000 ppm of Ni and V metals comprising: contacting said feed with a catalytic cracking catalyst comprising:
(a) at least about 15% by weight Y-faujasite crystallized in-situ from a metakaolin-containing calcined microsphere; and
(b) alumina obtained by the calcination of a dispersible boehmite contained in said microsphere.

42. The method of claim 41 wherein said microsphere further contains spinel, mullite or both spinel and mullite.

43. The method of claim 42 wherein said calcined microspheres comprise 15 to 85% by weight metakaolin, 5–70% by weight spinel, mullite, or both spinel and mullite, and 10–40% by weight of said alumina.

44. The method of claim 43 wherein said calcined microspheres comprise 15–50% by weight metakaolin, 25–70% by weight mullite, and 15–40% by weight of said alumina.

45. The method of claim 41, wherein said hydrocarbon feed is a resid.

46. The method of claim 42, wherein said hydrocarbon feed is a resid.

47. The method of claim 43, wherein said hydrocarbon feed is a resid.

48. The method of claim 44, wherein said hydrocarbon feed is a resid.

* * * * *